2,846,353

CAPSULE AND METHOD OF PRODUCTION

Edward W. Pipher, Detroit, Mich.

No Drawing. Application September 4, 1956
Serial No. 607,579

7 Claims. (Cl. 167—83)

This invention relates to medicinal capsules, and more particularly, to zein capsules and to improved methods of manufacturing such capsules.

For years, medicinal capsules have been made almost without exception from gelatin, notwithstanding the fact that gelatin leaves much to be desired as a capsule-forming material. The criterion appeared to be the ready disintegration of the capsule in water so that, when such capsule is taken orally, it will disintegrate readily in the aqueous medium in the stomach so as to release the medicinal substances contained therein. Gelatin, of course, has this property.

On the other hand, gelatin is readily affected by the presence of moisture in the air or in the medicinal substance. For example, medicinal substances containing appreciably more than 8% water may not ordinarily be used in gelatin capsules, because the moisture tends to permeate the gelatin capsule walls and to leak out of the capsule. Extremely dry materials, having substantially less than about 7 or 8% moisture therein, also may not ordinarily be used in gelatin capsules without causing the gelatin to become extremely hard and even brittle. (As used herein, the terms "percent" and "parts" mean percent and parts by weight, unless otherwise designated.) In general, the gelatin itself must contain approximately 7% moisture in order to have its desired property; and the medicinal substance contained within the gelatin should have approximately the same moisture content to stabilize the system.

Other capsule-forming materials have been suggested, although none has appeared to have any commercial signficance. Such materials include the cellulose esters and ethers which are also water-soluble. Numerous attempts have also been made to manufacture a so-called "enteric" capsule which resists dissolution or disintegration in the digestive fluids of the stomach and does not undergo disintegration until it has passed into the intestine, so that the timing of the release of the medicine encapsulated thereby may be controlled; but substantially all attempts to make such capsules have been unsuccessful or have resulted in extremely expensive secondary coating or treating operations for the capsule. Such secondary operations involved attempts to form a water-resistant layer or coating on the outside of the capsule.

The instant invention is based upon an entirely different concept, namely, the concept of employing a water insoluble material as a capsule-forming material. The capsule-forming material of the instant invention is zein which is a commecially available prolamine that is soluble in 70 to 80% aqueous ethanol or 70 to 85% aqueuos isopropanol. At room temperatures, zein is insoluble in water (or slightly acid or alkaline aqueous systems), insoluble in absolute alcohol (ethanol) and insoluble in other neutral solvents such as acetone and diethyl ether. In fact, zein would be considered substantially inert to the aqueous conditions ordinarily occurring in the stomach of a human being. In the instant invention, the dissolving power of the aqueous acid media in the stomach (which is the means whereby previously employed capsules were caused to disintegrate) is not employed to effect the opening of the zein capsules. Instead, it is believed that the most important disintegrating or rupturing effect upon the instant capsules results from the action of the proteolytic enzymes or the digestive enzymes inherently present in the stomach. It was generally understood that the action of these enzymes is not particularly rapid, but the unusually tough and strong character of the instant zein films permits the use of films of minimum thickness in capsules and the attack upon these films by the proteolytic enzymes is sufficiently rapid to effect timely rupture of the capsules. Also, complete disintegration of the capsule shell is not a real necessity, since a mere rupture at one or more places in the shell is ordinarily sufficient to permit the effective release of the capsule contents to the fluids of the stomach or intestine. The instant invention has the advantage that accurate positive timing of the release of the contents of the capsules can be accomplished by control of the zein film thickness. A predetermined thickness in the film of a capsule will assure, for example, that this capsule is truly enteric, in that it will pass through the stomach without disintegration, but will disintegrate at a specified time when it reaches the small bowel of the intestine. In the case of the instant invention, this has been clearly demonstrated on tests performed on human beings.

The instant discovery is thus a complete departure from the fundamental concepts heretofore recognized by those skilled in the art. The use of a wtaer-soluble capsule shell, which was thought to be fundamental and essential by the prior workers in the art, had led to a great number of disadvantages. The instant invention, however, based upon the discovery of a water-insoluble material capable of carrying out the necessary functions in the stomach required of the capsule shell, provides a uniquely advantageous answer to a problem which has been plaguing pharmacists and pharmaceutical manufacturers for a great number of years.

Further, the use of water-insoluble zein, which is uniquely resistant to the effects of water on colloid-like materials (at least for use in medicinal capsules) permits the encapsulation of a much greater variety of materials than could heretofore be encapsulated because of the effects of water on gelatin and other encapsulating materials heretofore suggested.

It is, therefore, an important object of the instant invention to provide an improved medicinal capsule, and an improved method of making the same.

It is another object of the instant invention to provide an improved medicinal capsule consisting essentially of a container formed of a self-sustaining film of undenatured zein having a wall thickness of 0.002 to 0.05 inch, said capsule having contained therein a medicinal substance, said zein being soluble in 70–80% aqueous ethanol and insoluble at room temperature in water, in absolute alcohol and in acetone.

Still another object of the instant invention is to provide an improved method of making a capsule which comprises thoroughly admixing undenatured zein with water and with compatible solvent-plasticizers, heating the mix to form a homogeneous melt, filming the melt, and forming capsules from the film.

Other and further objects, features and advantages of the present invention will become apparent to those skilled in the art from the following detailed disclosure thereof.

In its basic aspects, the instant invention consists in a medicinal capsule consisting essentially of a thin walled container of self-sustaining zein film having contained therein a medicinal substance, and an improved method of making the same.

As used herein, the term "medicinal" is not limited merely to those ingredients or drugs which are administered for specific purposes of curing some particular disease, but the term includes any of the various ingredients which might possibly be taken in pill or capsule form, or as we shall see, which might heretofore be taken only in liquid form. Such medicinal substances include the various vitamin compositions, for example, which may contain various filler materials or the like, or which may possibly be employed in concentrated aqueous solutions, in view of their hygroscopic nature.

As has been pointed out, the basic material in the instant invention is zein. Zein is a prolamine that is obtained by solvent extraction from (corn) gluten meal. It is important to use undenatured zein in the instant capsule and method of producing the same. It is well known that proteins, when treated with drastic conditions such as strong acids, strong alkalis and/or high temperatures, undergo intra-molecular change which manifests itself by a change in certain properties. This phenomenon is known as denaturation. The denatured protein is found to be readily soluble in dilute acids and alkalis. In contrast, the instant zein is prepared under conditions which prevent denaturation, so that the instant zein will possess the inertness which makes it particularly useful in the formation of enteric capsules (which resist the aqueous acid medium of the stomach).

It has now been established that most of the zein described in the literature was denatured, presumably by drastic attempts used in the purification or rapid extraction thereof; and such denatured zein does not possess the properties required in the practice of the instant invention.

One method of producing undenatured zein involves preliminarily extracting dry corn gluten with 95% aqueous ethanol (so as to remove undesirable coloring agents), then extracting the gluten with 80 to 85% aqueous ethanol at about 60° C. to obtain a relatively slightly colored solution of zein (in about 10% concentration). This solution may then be treated with about 2% of high grade decolorizing carbon, so as to effect substantial removal of the coloring matter in the solution, and the alcohol and water may then be evaporated to obtain the zein. The present commercial method involves extracting gluten with 85% aqueous isopropanol at 60° C., followed by extraction with hexane to remove oils and coloring matter (followed by precipitation by an excess of water and drying).

It is generally understood that zein comprises extremely large molecules which behave in solution or suspension much like various well known sols and gels, in that zein in a suitable fluid solution acts as a sol, but if the solution is not unduly dilute, it may set up to form a gel which is in the nature of a solid solution, or a solution of the solvent in the gelled prolamine structure. For example, a 20% solution of zein in propylene glycol will remain clear and fluid for a very substantial period of time when stored at room temperature, while a similar concentration of zein in 85% aqueous ethanol stored at the same temperature usually gels in about 30 days. This gelled system may also be thermoplastic, so that it returns to the fluid state when heated slightly; and in this respect the zein system is a hot melt. Industrially, hot melts are considered materials that are solid at room temperature and liquid at elevated temperatures, such as paraffin.

It has been found that primary solvents for undenatured zein are hydroxy compounds, amines, amides, or carboxylic acids, in other words, containing —OH, —$NH_2$, —$CONH_2$, or —COOH groups. Denatured zein will, of course, dissolve in other primary solvents and does not possess the requisite inertness of undenatured zein for the purposes of the instant invention.

It is generally preferable to employ a plasticized zein. Plasticizers for zein are well known in the art, for example, as disclosed in U. S. Patent No. 2,115,716, issued to Donald W. Hansen. Preferably the plasticizers employed are non-toxic and non-volatile so as to remain permanently in the zein system. Solvents boiling substantially above the boiling point of water may also function as plasticizers, as will be seen. Typical examples of plasticizers which may be used in the practice of the instant invention are the $C_{12}$-$C_{18}$ fatty acids, which include lauric, myristic, palmitic, stearic, oleic, palmitoleic and myristoleic acids. Also esters of such fatty acids and polyhydric alcohols (such as ethylene glycol monostearate) and esters of hydroxylated organic acids (such as dibutyl tartrate) may be used as plasticizers. The amount of plasticizer used may range from about 10 to 100% of the weight of the zein.

As an example, a suitable zein solution is applied to a capsule-forming member, such as a member for forming one-half of a telescoping medicinal capsule. The form or capsule-forming member is dipped into a solution of the zein, which may be from about a 5% to about a 60% solids solution, and is preferably a 20–40% solid solution. Using a 40% solids solution of 80% ethyl alcohol in water, and a form for a number one (0.5 cc.) size capsule, it is possible to obtain a film thickness of about 0.008 inch in a single dipping operation. Repeated dipping operations may be employed to obtain film thicknesses of as much as 0.05 inch. Also, approximately a 20% solids zein solution in 75% ethyl alcohol in water may be used to obtain a film thickness of 0.005 inch in a single dipping operation. More dilute solutions may be used to obtain films of thicknesses in the range 0.002–0.008 inch (the preferred film thickness being about 0.003–0.005 for thin walled capsules). The solutions thus described are substantially fresh solutions, wherein the zein is in sol form, and during the drying of the films, a relatively non-porous coherent film is obtained more or less as a precipitate, as the volatile solvent materials escape.

Suitably mating telescoping capsule members prepared as just described, and having wall thicknesses of about 0.005 inch are used to enclose ascorbic acid, and the telescoping portions of the capsule members are sealed, by wetting the same with a concentrated aqueous ethyl alcohol solution and permitting the sealed portion to dry. Ascorbic acid is a well known crystalline hygroscopic material which must ordinarily be employed in the presence of a very substantial amount of filler material in the usual gelatin capsule. Usually about 25 milligrams of ascorbic acid are admixed with as much as 5 ccs. bulk of filler material, so as to render the resulting composition substantially non-hygroscopic. If substantially ascorbic acid were enclosed in a gelatin capsule, the ascorbic acid would undergo deliquescence by removal of water from the gelatin, which in turn would absorb more water from the atmosphere. In the instant capsule, however, the prolamine envelope is sufficiently moisture impermeable and water resistant to prevent the ascorbic acid from absorbing moisture from the atmosphere to the extent that it undergoes deliquescence. It will thus be seen that the instant capsules permit the use of ascorbic acid in the absence of excessive amounts of filler or bulk materials. Other hygroscopic materials, such as ferrous sulphate, procaine penicillin, and thyamine hydrochloride are equally satisfactory for use in the instant prolamine capsules, in the absence of the filler materials used for reducing the hygroscopic properties of these materials.

As another example, the aforementioned telescoping medicinal capsule members are filled with an aqueous extract of liver, having a 25% moisture content, and the mating capsule members are sealed in the manner hereinbefore described. The sealed capsule is allowed to stand in a suitable storage location so that leakage therefrom may be noticed. If a gelatin capsule were filled with such an aqueous extract, the capsule would show evidence of leakage in a matter of a few hours, or even a few minutes, if the moisture content is sufficiently high. In contrast, however, the instant capsule filled the aqueous liver extract just described shows no evidence of leakage after several weeks standing.

Substantially the same results as those just described may be obtained using undenatured zein that is plasticized with about one-third its weight of a suitable plasticizer such as dibutyl tartrate or ethylene glycol monostearate, or oleic acid.

A particularly useful embodiment of the instant invention resides in the so-called "soft shell" capsules and the method of making the same. In general, such capsules are made by carrying out the following steps:

(1) Thoroughly admixing 100 parts of undenatured zein with 25 to 65 parts of water;

(2) Admixing therewith 10 to 50 parts of a primary solvent for the zein, and preferably an alcoholic primary solvent; and 10 to 50 parts of a non-toxic non-volatile zein plasticizer soluble in said solvent;

(3) Holding the mix at from about 40 to 45° C. to just below the boiling point of the lowest boiling ingredient in the mix until a homogeneous hot melt is formed;

(4) Filming the melt into sheets of 0.01 to about 0.05 inch thickness; and (5) Forming capsules from the sheets.

In general, the amount of the solvent used ranges from a minimum amount which will dissolve the zein to a maximum amount above which self-adherence between the films is too difficult. The plasticizer used is that amount which renders the zein film reasonably flexible. The water is used as a lubricant and as an aid to solution in combination with the primary solvent and the maximum amount of water employed is an amount above which undue interference with the self-adherence of the sheets is obtained.

Referring now to a specific example, commercial (undenatured) zein powder (100 parts) in a dry state is placed in a container and stirred with the slow addition of 50 parts of cold water. It is important at this point to maintain substantially room temperature (or less than about 40° C.) until complete mixing of the zein powder and water is obtained to form a uniform mix having no agglomerates or hard knotty particles which tend to form if the water is added too rapidly and/or excessive temperatures are permitted. Under these conditions the zein has a peculiar affinity for the water and temperatures above about 40° C. the water will cause swelling of the zein and denaturation. After the water is added, a solution of 25 parts of oleic acid dissolved in 25 parts of propylene glycol is added slowly to the mix with stirring to again obtain a complete and uniform admixture, which is a heavy mass that is so viscous that it is almost solid in character. With continued stirring, the mass is heated slowly. In order to avoid local overheating stirring and a slow rate of heating are employed and the mass is then held at a temperature between about 40 to 45° C. to just below the boiling point of the lowest boiling ingredient in the mix, which here is the water. Actually, the heating is carried out very slowly so that the material changes from an initial semi-solid state to a heavy tar-like state and then to a fluid of about the consistency of molasses. At this point, which is a temperature of 60–65° C. using the preferred slow heating procedure (the material is in the form of a homogeneous hot melt which is cast or filmed into sheets of approximately 0.05 inch). In the casting operation, the material in a liquid state maintained at 65–85° C. is fed under a doctor blade onto a cold forming surface maintained at approximately 45° F. (preferably a metal roll maintained at 32–50° F.). As the mass or hot melt hits the cold forming surface the temperature drops immediately and the mass becomes a solid that is a self-sustaining film. A certain amount of water is given up by the hot melt during this cooling operation, but this water functions as a lubricant on both sides of the sheet.

The sheets are then used in capsulating machines in substantially the same manner that gelatin sheets are now used. The operation of these capsulating machines is well known and need not be described herein in detail. In essence, these machines comprise a pair of rotatable rolls, at least one of which has a plurality of dish-shaped cavities therein; and each of these rolls is lapped with a sheet of zein (or gelatin in the prior art operations). The two rolls define a press nip at which the sheets of zein are brought into contact with each other, and at just this point a needle-like device injects a medicinal substance between the sheets, and the force of this injection causes the sheet or sheets to flow back into a dish-shaped cavity, thereby forming the capsule. The use of the medicinal substance itself to provide the hydraulic force for urging the sheet material into the cavity thus prevents the inclusion of air or other undesirable materials in the formed capsule. The pressure between the sheets effects the sealing thereof around the mouth of the cavity, and the capsules are subsequently separated from what remains of the sheet.

The hereinbefore described sheets are employed in such an operation wherein barium sulfate is employed as the medicinal substance. Just before the sheets reach the nip of the rolls, they are heated to about 90° F. (preferably 70°–95° F.) to soften the same additionally so that they will stretch properly when the medicinal substance urges the sheets into the cavities and so that the opposed surfaces of the sheets will have sufficient tackiness to heat seal. In the final capsule, which is separated from the remainder of the sheets, the wall thickness has a shrinkage of approximately 20%, so that the resulting capsule walls have a thickness of about 0.04 inch.

Six of such capsules (containing barium sulfate) were taken orally on an empty stomach by a patient, and X-rays showed clearly that the capsules in each case showed no signs of dissolution or disintegration in the patient's stomach after two hours (at which time some capsules were still in the stomach and others were in the duodenum and jejunum). After 2½ hours, however, all of the capsules had reached the small intestines and all were shown by the X-ray to have undergone at least initial disintegration.

The encapsulating procedure just mentioned in connection with the instant sheets was also carried out using ascorbic acid, ferrous sulfate, procain penicillin, and thyamine hydrochloride, and equally satisfactory results (comparable to those obtained with the telescoping capsule) were obtained.

It will thus be seen that the instant capsules offer unique advantages in the medicinal field, in that they permit the use of dry materials, even dry hygroscopic medicinal substances, as well as definitely dilute aqueous extracts or solutions in the capsules.

The unique feature of the instant invention resides in the fact that the zein body of the capsule presents a substantially water impermeable barrier, so that such capsules may, for example, be filled with plain water and yet retain their shape and the water therein during prolonged storage. On the other hand, dry hygroscopic materials may also be enclosed in the instant capsules and stored for prolonged periods without their taking on appreciable amounts of water. As used herein, the term "hygroscopic" means a material which is, in fact, hygroscopic as such, as contrasted to the filler materials heretofore employed with gelatin capsules which comprise a very minute amount of hygroscopic material combined with such a substantial amount of filler material that the resulting composition was, in fact, not appreciably hygroscopic. It will be appreciated, of course, that such filler-diluted hygroscopic materials might also be used in the instant zein capsules; but it is not necessary to dilute such hygroscopic materials with filler materials, if it is desired to use these materials in the instant zein capsules.

The zein capsules of the telescoping type prepared as hereinbefore described have relatively thin walls which are quite readily ruptured by a suitable proteolytic enzyme such as the digestive enzymes, or their equivalents, trypsin and pepsin. The effectiveness of trypsin and pepsin may be demonstrated in the laboratory; and the taking of such capsules by human beings may also serve to demonstrate the effectiveness thereof. The thin walled telescoping capsules may have wall thicknesses of as little as 0.002 to 0.008 inch, so that they may be suitably ruptured in the stomach itself; but in the case of the soft shell capsules hereinbefore described, which may have thicknesses of as much as 0.01 inch to 0.05 inch or 0.06 inch have much thicker walls in order to obtain a "delayed effect." It will be appreciated that repeated dippings in the formation of telescoping capsules may also result in wall thicknesses of as much as 0.05 inch. If an extremely hygroscopic material is to be used or if an extremely dilute aqueous solution is to be used, it is advisable to use zein capsules having thickened walls of up to 0.05 inch. In such instances, if it is desired to have a "quick effect" from the use of the capsule, it is most advisable to form one or more localized indentations in the capsule wall to prevent an overall structural defect while providing an easily ruptured region. As will be appreciated, such indentations might be made on the outside of the capsule wall, or they may be made by means of a slight projection on a capsule-forming member for a telescoping capsule. Indentations of the size made by an ordinary pin have been found to be adequate for the purpose of effecting the desired quick rupture or quick action. This again points out the difference in thinking upon which the instant invention is based, since the instant invention involves the concept of merely obtaining one or two ruptures in the capsule wall (such as desired during use) as contrasted to the complete disintegration of the capsule in the time desired, which was the principal concept employed by the prior workers in the art.

In the formation of the telescoping capsule, it is generally preferable to employ an aqueous alcoholic solution of the zein (which may also contain 10% to 50% of the zein weight of a plasticizer such as oleic acid). Preferably the solvent is 60 to 95% ethyl alcohol and the remainder water in such a procedure.

In the formation of the soft shell capsule, it has already been explained that the water functions as a lubricant in combination with the primary solvent. Primary solvents such as isopropanol and ethanol may be substituted for the propylene glycol in the hereinbefore described procedure used for obtaining the sheets for making soft shelled capsules. The heating of the hot melt to obtain initial homogeneity is, in such case, not carried out above about 70° C., because of the lower boiling temperatures of propanol or ethanol, but the procedure is otherwise the same and the results obtained are only slightly different in that there is a greater loss of propanol and ethanol and thus less plasticizing effect from the residual solvent (such as in the case of propylene glycol). Propylene glycol is, however, preferred for use in the soft shell capsule manufacture. The other fatty acid plasticizers hereinbefore described can be substituted in whole or in part for oleic acid in the procedure just described.

Although a harder shell capsule is obtained, the fatty acid plasticizer may be omitted in the manufacture of capsules from zein sheets, or it may be partially omitted. In such case the alcoholic solvent incorporated in the zein may be used in amounts as high as 75% of the zein. The use of higher amounts of solvent may also serve to form a relatively porous sheet structure in the final capsule, after the solvent has evaporated.

In general, the term "medicinal" is used herein to indicate the preferred use contemplated for the instant capsule; but this term also indicates the (round or elongated) spheroid shape, the air-excluding capsule seal, the size and other structural features directly associated with the preferred use in oral ingestion. Most preferably oral ingestion with human beings is contemplated; but capsules up to as much as 30 cc. may be prepared for oral ingestion by animals such as horses and cows. Capsules of comparable structure embodying the invention are also used in cooking (containing certain amounts of chicken fat, beef fat, etc.), in agriculture (containing small amounts of fertilizer concentrates, plant hormones, etc.) and so forth. "Medicinal" capsules may thus have all of the structural characteristics of a capsule used for medicinal purposes, but such "medicinal-structure" capsules embodying the invention may have other potential uses (where the structure of specified material filling a sealed spheroid to the exclusion of air, moisture, etc. might be used as a unit in a use involving destruction of the capsule shell to release the material). The medicinal-structure capsule thus excludes, for example, packaged frozen foods as ordinarily distributed. This is a continuation-in-part of my application Serial No. 339,490, filed February 27, 1953, and now abandoned.

It will be understood that modifications and variations may be effected without departing from the scope of the novel concepts of the present invention.

I claim as my invention:

1. A medicinal capsule consisting essentially of a container formed of a self-sustaining film of undenatured zein having a wall thickness of 0.002 to 0.05 inch, said capsule having contained therein a medicinal substance, said zein being soluble in 70–80% aqueous ethanol and insoluble at room temperature in water, in absolute alcohol and in acetone.

2. A telescoping medicinal capsule, the substance of which is formed of a self-sustaining film of undenatured zein having a wall thickness of 0.002 to 0.008 inch, said zein being soluble in 70–80% aqueous ethanol and insoluble at room temperature in water, in absolute alcohol and in acetone.

3. A soft shell medicinal capsule comprising a medicinal substance and a self-sustaining film enclosing the medicinal substance consisting essentially of 100 parts of undenatured zein, 10 to 50 parts of propylene glycol, 10 to 50 parts of $C_{12}$–$C_{18}$ fatty acid, and 25 to 65 parts of water, said zein being soluble in 70–80% aqueous ethanol and insoluble at room temperature in water, in absolute alcohol and in acetone.

4. A soft shell medicinal capsule comprising a medicinal substance and a self-sustaining film enclosing the medicinal substance consisting essentially of 100 parts of undenatured zein, 25 parts of propylene glycol, 25 parts of oleic acid, and 50 parts of water, said zein being soluble in 70–80% aqueous ethanol and insoluble at room temperature in water, in absolute alcohol and in acetone.

5. A soft shell medicinal capsule comprising a medicinal substance and a self-sustaining film enclosing the medicinal substance consisting essentially of 100 parts of undenatured zein, 10 to 50 parts of an alcoholic solvent selected from the group consisting of propylene glycol, propanol and ethanol, 10 to 50 parts of a non-toxic non-volatile zein plasticizer soluble in said alcoholic solvent and 25 to 65 parts of water, said zein being soluble in 70–80% aqueous ethanol and insoluble at room temperature in water, in absolute alcohol and in acetone.

6. A method of making a capsule that comprises (1) thoroughly admixing 100 parts of undenatured zein with 25 to 65 parts of water, said zein being soluble in 70–80% aqueous ethanol and insoluble at room temperature in water, in absolute alcohol and in acetone; (2) admixing therewith 10 to 50 parts of an alcoholic solvent selected from the group consisting of propylene glycol, propanol and ethanol and 10 to 50 parts of a non-toxic non-volatile zein plasticizer soluble in said alcoholic solvent; (3)

holding the mix at from 40° C. to just below the boiling point of the lowest boiling ingredient in the mix until a homogenous hot melt is formed; (4) filming the melt into sheets; and (5) forming capsules from said sheets.

7. A method of making a capsule that comprises (1) thoroughly admixing 100 parts of undenatured zein with 50 parts of water, said zein being soluble in 70–80% aqueous ethanol and insoluble at room temperature in water, in absolute alcohol and in acetone; (2) admixing therewith 25 parts of propylene glycol and 25 parts of oleic acid; (3) holding the mix at from 40° C. to just below 100° C. until a homogenous hot melt is formed; (4) filming the melt into sheets; and (5) forming capsules from said sheets.

References Cited in the file of this patent

UNITED STATES PATENTS

| | | |
|---|---|---|
| 874,310 | Bonard et al. | Dec. 17, 1907 |
| 2,115,716 | Hansen | May 3, 1938 |
| 2,196,283 | Zick et al. | Apr. 9, 1940 |